United States Patent
Li et al.

(10) Patent No.: US 10,815,107 B2
(45) Date of Patent: Oct. 27, 2020

(54) VEHICLE MOUNTED WITH INSULATED AERIAL WORK PLATFORM AND AUTOMATIC RADIUS LIMITING METHOD FOR INSULATED WORK PLATFORM

(71) Applicant: XUZHOU HANDLER SPECIAL VEHICLE CO., LTD., Xuzhou (CN)

(72) Inventors: Peiqi Li, Xuzhou (CN); Jianping Ding, Xuzhou (CN); Dengbo Yuan, Xuzhou (CN); Lei Zheng, Xuzhou (CN); Zehua Zhang, Xuzhou (CN)

(73) Assignee: XUZHOU HANDLER SPECIAL VEHICLE CO., LTD., Xuzhou (CN)

( * ) Notice: Subject to any disclaimer, the term of this patent is extended or adjusted under 35 U.S.C. 154(b) by 0 days.

(21) Appl. No.: 16/485,170

(22) PCT Filed: Apr. 20, 2017

(86) PCT No.: PCT/CN2017/081205
§ 371 (c)(1),
(2) Date: Aug. 12, 2019

(87) PCT Pub. No.: WO2018/170982
PCT Pub. Date: Sep. 27, 2018

(65) Prior Publication Data
US 2020/0039805 A1    Feb. 6, 2020

(30) Foreign Application Priority Data
Mar. 24, 2017   (CN) .......................... 2017 1 0182996

(51) Int. Cl.
*B66F 17/00*     (2006.01)
*B66F 11/04*     (2006.01)
(Continued)

(52) U.S. Cl.
CPC .......... *B66F 17/006* (2013.01); *B66F 11/046* (2013.01); *G01B 5/02* (2013.01); *G01C 9/00* (2013.01)

(58) Field of Classification Search
CPC ...... B66F 17/00; B66F 17/006; B66F 17/046; B66F 11/044; G01B 5/02; G01B 5/04; G01C 9/00
See application file for complete search history.

(56) References Cited

U.S. PATENT DOCUMENTS 3,575,262  A  *  4/1971  Way ...................... B66F 11/044
                                                       182/2.7
4,187,927  A  *  2/1980  Byrne .................. B66F 11/044
                                                       182/2.4
(Continued)

FOREIGN PATENT DOCUMENTS

CN             2668907 Y     1/2005
CN           104591051 A     5/2015
(Continued)

*Primary Examiner* — Katherine W Mitchell
*Assistant Examiner* — Shiref M Mekhaeil
(74) *Attorney, Agent, or Firm* — Bayramoglu Law Offices LLC

(57) ABSTRACT

A vehicle mounted with the insulated aerial work platform includes a work platform radius limiting device which includes the lower boom inclination angle detecting sensor, and further includes the lower boom length detecting sensor, the upper boom derricking detecting sensor and the upper boom length detecting sensor, which each include an distance measuring rope and an insulated distance measuring rope retraction-and-extension measuring mechanism. The extension lengths of all of the insulated distance measuring ropes are detected in real time to calculate the actual working radius of the insulated work platform. When the actual working radius is less than the predetermined maximum working radius, the operator is allowed to perform the (Continued)

operational action of increasing the working radius. When the actual working radius is greater than or equal to the predetermined maximum working radius, the operator is limited from performing any the operational action related to increasing the working radius.

12 Claims, 8 Drawing Sheets

(51) Int. Cl.
  *G01B 5/02* (2006.01)
  *G01C 9/00* (2006.01)

(56) References Cited

U.S. PATENT DOCUMENTS

| | | | | |
|---|---|---|---|---|
| 4,456,093 A | * | 6/1984 | Finley | B66F 17/006 |
| | | | | 182/18 |
| 4,606,469 A | * | 8/1986 | Van Deijk | B66C 13/54 |
| | | | | 212/256 |
| 4,676,339 A | * | 6/1987 | Rybka | B66C 19/002 |
| | | | | 182/142 |
| 5,551,527 A | * | 9/1996 | Luscombe | B66F 11/046 |
| | | | | 182/141 |
| 6,272,413 B1 | * | 8/2001 | Takahashi | B66F 11/046 |
| | | | | 182/115 |
| 8,187,045 B2 | * | 5/2012 | Thibodaux | B63B 35/44 |
| | | | | 440/37 |
| 9,915,396 B2 | * | 3/2018 | Castro Salinas | B66F 11/044 |
| 2004/0085184 A1 | * | 5/2004 | Sigmund | B66F 17/006 |
| | | | | 340/3.42 |
| 2005/0224439 A1 | * | 10/2005 | Bean | B66F 11/046 |
| | | | | 212/280 |
| 2013/0253759 A1 | * | 9/2013 | Matsumoto | B66C 13/16 |
| | | | | 701/31.1 |
| 2018/0265336 A1 | * | 9/2018 | Xu | B66C 15/045 |
| 2020/0031642 A1 | * | 1/2020 | Uchimura | B60Q 9/00 |

FOREIGN PATENT DOCUMENTS

| | | |
|---|---|---|
| CN | 104724645 A | 6/2015 |
| CN | 106044662 A | 10/2016 |
| CN | 206590844 U | 10/2017 |

* cited by examiner

VEHICLE MOUNTED WITH INSULATED AERIAL WORK PLATFORM AND AUTOMATIC RADIUS LIMITING METHOD FOR INSULATED WORK PLATFORM

CROSS REFERENCE TO RELATED APPLICATIONS

This application is the national phase entry of International Application PCT/CN2017/081205, filed on Apr. 20, 2017 which is based upon and claims priority to Chinese Patent Application No. 201710182996.6, filed on Mar. 24, 2017 the entire contents of which are incorporated herein by reference.

TECHNICAL FIELD

The present disclosure relates to a vehicle mounted with an aerial work platform and a radius limiting method for the aerial work platform, in particular to a vehicle mounted with an insulated aerial work platform and an automatic radius limiting method for the insulated work platform, which pertains to the technical field of vehicle mounted with aerial work platforms.

BACKGROUND

The vehicle mounted with aerial work platform, an application-specific special vehicle which allows the working personnel and the required materials to gain access to installation, maintenance and cleaning of the facilities located in high places, is advantageous in good work performance, high work efficiency, safety operation and so on over the traditional work modes of using scaffolds and ladders etc. The vehicles mounted with aerial work platform are now extensively applied in infrastructure industries including power, transportation, petrochemicals, communications, gardening, etc.

With the economic growth and the social evolution, people have constantly put forward higher requirements to the maintenance and rapid response of the power supply. Vehicle mounted with insulated aerial work platform, which has the advantages of quick response, high work efficiency, convenient for lifting, wide operating range, and good electrical insulation performance etc., and allows live-working, are widely used in the industries of electric power, telecommunication, etc. The vehicles mounted with insulated aerial work platform are generally coated with the insulation paint on the surface, use insulation hydraulic oil, and may be classified according to insulation levels characterized by the rated voltages 10 kV, 35 kV, 63 kV, 110 kV, 220 kV, etc.

The vehicles mounted with large-height insulated aerial work platform in the prior art mainly employ a double-articulating and double-telescopic hybrid boom structure. In order to meet the requirement for the to-ground insulation performance in the live working, the end section arm (i.e. the section arm connected to the working cage) of the upper telescopic arm is generally made of insulated material and is the main insulation end. In order to meet the requirement for protecting the ground operators from the low-altitude electrified elements, the basic section arm (i.e. the section arm connected to the turntable) of the lower telescopic arm is generally provided with an auxiliary insulation section near the turntable. The arrangement of the auxiliary insulation section prevents the installation of the electronic sensor on the upper telescopic arm which aims to detect the elevation angle and elongation signal of the upper telescopic arm, thereby disabling the real-time monitoring of the radius control of the boom working state. As a result, the existing vehicle mounted with articulating and insulated aerial work platform fails to offer the radius limiting function for the insulated boom. In general, it is the operator on the working platform who takes safe actions of judging based on personal experience and manually controlling the boom to cross over the obstacles or avoid the obstacles. It is hazardous to carry out the safe actions by simply relying on the operating experience of the operator. If the operator is unfamiliar with the working condition on the site or the operations of the work vehicle, then the stability of the work vehicle will be impaired, thereby posing risk of causing danger or even toppling/overturn of the work vehicle.

The Chinese patent No. 104724645A discloses a radius limiting system for an insulated aerial work platform, according to which the amount of elongation of the telescopic arm and the boom angle relative to the ground are determined by remotely monitoring the hydraulic pressure of the derricking cylinder and monitoring the liquid flow rate in the derricking cylinder, thereby achieving the detection and control of the operation radius of the aerial work platform. However, the detection of the hydraulic pressure and the flow rate depends on the power supply, and the detection accuracy depends on the accuracy of the sensor. Moreover, the signal output of the consecutive movements of the boom needs to be consecutively stored, so it requires a large amount of data throughput.

SUMMARY

In view of the above-mentioned problems, the present disclosure proposes a vehicle mounted with an insulated aerial work platform and an automatic radius limiting method for the insulated work platform, which can realize the automatic radius limiting of the articulating boom without configuring radius limiting electrical elements on the upper insulated and articulating boom, so as to ensure the stability of the whole work vehicle and prevent the insulated work platform from wholly toppling/overturning or prevent boom damage caused by moving over the radius range requirement of the operation.

In order to achieve the above-mentioned objectives, the vehicle mounted with an insulated aerial work platform includes a vehicle body assembly, a turntable, a boom assembly, an insulated work platform, and a work platform radius limiting device.

The turntable is mounted on the vehicle body assembly by a stewing bearing and a stewing drive.

The boom assembly includes a lower boom portion and an upper boom portion. The lower boom portion includes a basic section arm and a basic telescopic arm, and the upper boom portion includes a two-section arm and a two-section telescopic arm. One end of the basic section arm is hingedly connected to the turntable. The basic section arm is provided with an auxiliary insulation section. At least one basic telescopic arm is telescopically provided inside the basic section arm. One end of the two-section arm is hingedly connected to an end portion of an end section of the basic telescopic arm. At least one two-section telescopic arm is telescopically provided inside the two-section arm. An end section of the two-section telescopic arm is a main insulation end. The main insulation end is connected to the insulated work platform through an automatic leveling device.

The work platform radius limiting device includes a lower boom inclination angle detecting sensor, a lower boom length detecting sensor, an upper boom derricking detecting sensor, an upper boom length detecting sensor and an electrical control mechanism.

The lower boom inclination angle detecting sensor is provided on a root portion metal section of the basic section arm, and the root portion metal section is located behind the auxiliary insulation section near a hinge position of the turntable.

The lower boom length detecting sensor, the upper boom derricking detecting sensor and the upper boom length detecting sensor each include an insulated distance measuring rope and an insulated distance measuring rope retraction-and-extension measuring mechanism. One end of each insulated distance measuring rope is fixed and a remaining part of the insulated distance measuring rope is wound on the corresponding insulated distance measuring rope retraction-and-extension measuring mechanism. Each insulated distance measuring rope retraction-and-extension measuring mechanism is provided on the root portion metal section of the basic section arm, and the root portion metal section is located behind the auxiliary insulation section near the hinge position of the turntable. The insulated distance measuring rope retraction-and-extension measuring mechanism has an automatic rewinding structure. The upper boom derricking detecting sensor and the upper boom length detecting sensor each further include an insulated rope guiding sheave. Two insulated distance measuring rope guiding sheaves are set and mounted at a hinge position of the end portion of the end section of the basic telescopic arm. The other end of the insulated distance measuring rope of the lower boom length detecting sensor is connected to a tail portion of the end section of the basic telescopic arm. The other end of the insulated distance measuring rope of the upper boom derricking detecting sensor is connected to a tail portion of an end section of the two-section arm via a guiding of the corresponding insulated rope guiding sheave derricking detecting. The other end of the insulated distance measuring rope of the upper boom length detecting sensor is connected to a tail portion of the main insulation end via a guiding of the corresponding insulated rope guiding sheave.

The electrical control mechanism includes a central processing unit, a data collection and feedback loop, an insulated work platform radius calculation and output loop, a data comparison loop, a radius limiting control loop and a controller. The central processing unit is electrically connected to the lower boom inclination angle detecting sensor and the controller, respectively. The central processing unit is electrically connected to the insulated distance measuring rope retraction-and-extension measuring mechanisms of the lower boom length detecting sensor, the upper boom derricking detecting sensor and the upper boom length detecting sensor. The controller is electrically connected to a vehicle-mounted hydraulic system.

As a further improvement of the present disclosure, the lower boom inclination angle detecting sensor, the lower boom length detecting sensor, the upper boom derricking detecting sensor and the upper boom length detecting sensor are all set and mounted inside the basic section arm. The other ends of the insulated distance measuring ropes of the upper boom derricking detecting sensor and the upper boom length detecting sensor are all mounted at places inside the upper boom portion.

As a further improvement of the present disclosure, the insulated distance measuring rope of the lower boom length detecting sensor, the insulated distance measuring rope, located inside the lower boom portion, of the upper boom derricking detecting sensor, and the insulated distance measuring rope, located inside the lower boom portion, of the upper boom length detecting sensor are all arranged in parallel to a central axis of the lower boom portion. The insulated distance measuring rope, located in the upper boom portion, of the upper boom length detecting sensor is arranged in parallel to a central axis of the upper boom portion.

As a further improvement of the present disclosure, the insulated rope guiding sheave of the upper boom derricking detecting sensor and the insulated rope guiding sheave of the upper boom length detecting sensor are concentrically mounted.

As a further improvement of the present disclosure, the insulated rope guiding sheave of the upper boom derricking detecting sensor and the insulated rope guiding sheave of the upper boom length detecting sensor are coaxially mounted, and are dimensionally identical.

As a further improvement of the present disclosure, the other end of the insulated distance measuring rope of the upper boom derricking detecting sensor is connected to an inner side surface of the tail portion of the two-section arm at a relatively far position from the hinge position.

An automatic radius limiting method for a work platform of the vehicle mounted with the insulated aerial work platform, includes the following steps:

a. data collection: starting up the data collection and feedback loop, collecting, by the central processing unit of the electrical control mechanism, a pitch angle of the lower boom portion via the lower boom inclination angle detecting sensor in real time, and detecting, by the insulated distance measuring rope retraction-and-extension measuring mechanisms of the lower boom length detecting sensor, the upper boom derricking detecting sensor, and the upper boom length detecting sensor, extension lengths of insulated distance measuring ropes of the lower boom length detecting sensor, the upper boom radius detecting sensor, and the upper boom length detecting sensor in real time.

b. data calculation: starting up the insulated work platform radius calculation and output loop, calculating, by the central processing unit of the electrical control mechanism, an actual working radius of the insulated work platform according to data feedback and a set program;

c. data comparison and output: starting up the data comparison loop and the radius limiting control loop, comparing, by the central processing unit of the electrical control mechanism, an actual working radius of the insulated work platform with a predetermined maximum working radius of the insulated work platform, and then outputting a comparison result;

d. radius limiting control: when the actual working radius is less than the predetermined maximum working radius, outputting, by the central processing unit of the electrical control mechanism, a signal to the controller to allow an operator to perform an operational action of increasing a working radius, and when the actual working radius is greater than or equal to the predetermined maximum working radius, outputting, by the central processing unit of the electrical control mechanism, a signal to the controller to limit the operator from performing any operational action related to increasing the working radius.

A method for determining the actual working radius of the insulated work platform of the present disclosure is as follows:

when the basic telescopic arm and the two-section telescopic arm are in an initial state of full retraction, setting an initial length of the lower boom portion to $L_{0lower}$, setting an initial length of the upper boom portion to $L_{0upper}$, and setting an initial angle between the lower boom portion and a level surface to $A_1$, wherein at this time, a reading of an angle from the lower boom inclination angle detecting sensor is $A_1$;

setting an initial angle between the upper boom portion and the lower boom portion to $A_2$, setting an initial extension length of the insulated distance measuring rope of the lower boom length detecting sensor to $L_1$, setting an initial extension length of the insulated measuring distance rope of the upper boom derricking detecting sensor to $L_2$, and setting an initial extension length of the insulated distance measuring rope of the upper boom length detecting sensor to $L_3$;

when the lower boom portion is lifted, setting the angle between the lower boom portion and the level surface to $A_1'$;

when the upper boom portion is lifted relative to the lower boom portion, setting an angle between the upper boom portion and the lower boom portion to $A_2'$, setting a length of the insulated distance measuring rope of the upper boom derricking detecting sensor to $L_2'$, and setting a length of the insulated distance measuring rope of the upper boom length detecting sensor to $L_3'$;

after an $n^{th}$ section arm of the basic telescopic arm of the lower boom portion is extended by a distance, setting the length of the insulated distance measuring rope of the lower boom length detecting sensor to $L_1'$;

when a total length of the lower boom portion and the angle between the upper boom portion and the lower boom portion are maintained in the initial state, and an $m^{th}$ section arm of the two-section telescopic arm of the upper boom portion is extended by a distance, setting a length of the insulated distance measuring rope of the upper boom length detecting sensor to $L_3''$;

setting a distance between an outlet position of the insulated distance measuring rope of the insulated distance measuring rope retraction-and-extension measuring mechanism of the upper boom derricking detecting sensor and a tangent point c of the insulated distance measuring rope and the insulated rope guiding sheave of the upper boom derricking detecting sensor to $L_{31}$, and setting a distance between an end portion of the insulated distance measuring rope, connected to the tail portion of two-section arm, of the upper boom derricking detecting sensor and a tangent point d of the insulated distance measuring rope and the insulated rope guiding sheave of the upper boom derricking detecting sensor to $L_{33}$; then, when the upper boom portion and the lower boom portion are both in the initial state, a length $L_{32}$ of the insulated distance measuring rope of the upper boom derricking detecting sensor wound on the insulated rope guiding sheave of the upper boom derricking detecting sensor is $$L_{32}=L_3-L_{31}-L_{33};$$

setting a distance between an outlet position of the insulated distance measuring rope of the insulated distance measuring rope retraction-and-extension measuring mechanism of the upper boom length detecting sensor and a tangent point a of the insulated distance measuring rope and the insulated rope guiding sheave of the upper boom length detecting sensor to $L_{21}$, and setting a distance between an end portion of the insulated distance measuring rope, connected to the tail portion of the main insulation end, of the upper boom length detecting sensor and a tangent point b of the insulated distance measuring rope and the insulated rope guiding sheave of the upper boom length detecting sensor to $L_{23}$; then, when the upper boom portion and the lower boom portion are in the initial state, a length $L_{22}$ of the insulated distance measuring rope of the upper boom length detecting sensor wound on the insulated rope guiding sheave of the upper boom length detecting sensor is $$L_{22}=L_2-L_{21}-L_{23};$$

setting a pitch diameter of a rope groove on the insulated rope guiding sheave of the upper boom derricking detecting sensor to $R_1$, and setting a pitch diameter of a rope groove on the insulated rope guiding sheave of the upper boom length detecting sensor to $R_2$;

when the upper boom portion and the lower boom portion move from the initial state to a given position, the angle between the lower boom portion and the level surface is $A_1'$, and the length $L_{32}'$ of the insulated distance measuring rope of the upper boom derricking detecting sensor wound on the insulated rope guiding sheave of the upper boom derricking detecting sensor is $$L'_{32} = L_{32} - \frac{R_2}{R_1} \cdot (L'_{22} - L_{22});$$

at this time, the length $L_{22}'$ of the insulated distance measuring rope of the upper boom length detecting sensor wound on the insulated rope guiding sheave of the upper boom length detecting sensor is $$L_{22}'=L_2'-[L_{21}+(L_1'-L_1)]-L_{23};$$

a variation of the angle between the upper boom portion and the lower boom portion is $$A'_2 - A_2 = \frac{(L'_{22} - L_{22}) \times 180}{\pi \cdot R_2};$$

at this time, a length of the lower boom portion is $$L_{lower}=L_{0lower}+(L_1'-L_1);$$

at this time, a length of the upper boom portion is $$L_{upper}=L_{0upper}+[L_3'-L_3-(L_1'-L_1)-L_{32}'];$$

then, the actual working radius R of the insulated aerial work platform is calculated as below, when $0° \leq A_1' \leq 90°$, and $A_1' < A_2'$, $$R=|L_{lower}\cdot\cos A_1'-L_{upper}\cdot\cos(A_1'-A_2')|;$$

when $0° \leq A_1' 90°$, and $A_1' > A_2'$, $$R=|L_{lower}\cdot\cos A_1'-L_{upper}\cdot\cos(A_2'-A_1')|;$$

when $90° < A_1' < 180°$, and $A_1' < A_2'$, $$R=L_{lower}\cdot\cos A_1'+L_{upper}\cdot\cos(180°-A_1'-A_2');$$

when $90° < A_1' 180°$, and $A_1' > A_2'$ $$R=L_{lower}\cdot\cos A_1'+L_{upper}\cdot\cos(A_1'-A_2').$$

Compared with the prior art, the work platform radius limiting device of the vehicle mounted with insulated aerial work platform includes the lower boom inclination angle detecting sensor, the lower boom length detecting sensor, the upper boom derricking detecting sensor, and the upper arm length detecting sensor. Further, the lower boom length detecting sensor, the upper boom derricking detecting sensor, and the upper boom length detecting sensor each include the insulated distance measuring rope and the insulated distance measuring rope retraction-and-extension measuring mechanism. The lower boom inclination angle detecting sensor and all the insulated distance measuring rope retraction-and-extension measuring mechanisms are provided on the root portion metal section of the basic section arm behind the auxiliary insulation section near the hinge position of the turntable. The extension length of each insulated distance measuring rope is detected in real time to calculate the actual working radius of the insulated work platform. When the actual working radius is less than the predetermined maximum working radius, the central processing unit of the electrical control mechanism outputs the signal to the controller to allow the operator to perform an operational action related to increasing the working radius. When the actual working radius is greater than or equal to the predetermined maximum working radius, the central processing unit of the electrical control mechanism outputs the signal to the controller to limit the operator from performing any operation related to increasing the working radius. Therefore, the automatic radius limiting of the articulating boom is achieved without the need to provide radius limiting electrical elements on the upper insulated articulating boom, so as to ensure the stability of the whole vehicle and prevent the insulated work platform from wholly toppling/overturning or prevent boom damage caused by moving over the radius range requirement of the operation. The present disclosure especially holds good for insulated aerial work vehicles.

In the figures: 1, basic section arm, 11, auxiliary insulation section, 2, basic telescopic arm. 3, two-section arm, 4, two-section telescopic arm, 41, main insulation end, 5, lower boom inclination angle detecting sensor, 6, lower boom length detecting sensor, 7, upper boom derricking detecting sensor, 8, upper boom length detecting sensor.

DETAILED DESCRIPTION OF THE EMBODIMENTS

The present disclosure will be further described hereinafter with reference to the drawings.

The vehicle mounted with insulated aerial work platform includes a vehicle body assembly, a turntable, a boom assembly, an insulated work platform and a work platform radius limiting device.

The turntable is mounted on the vehicle body assembly by a stewing bearing and a stewing drive.

Figure 1:
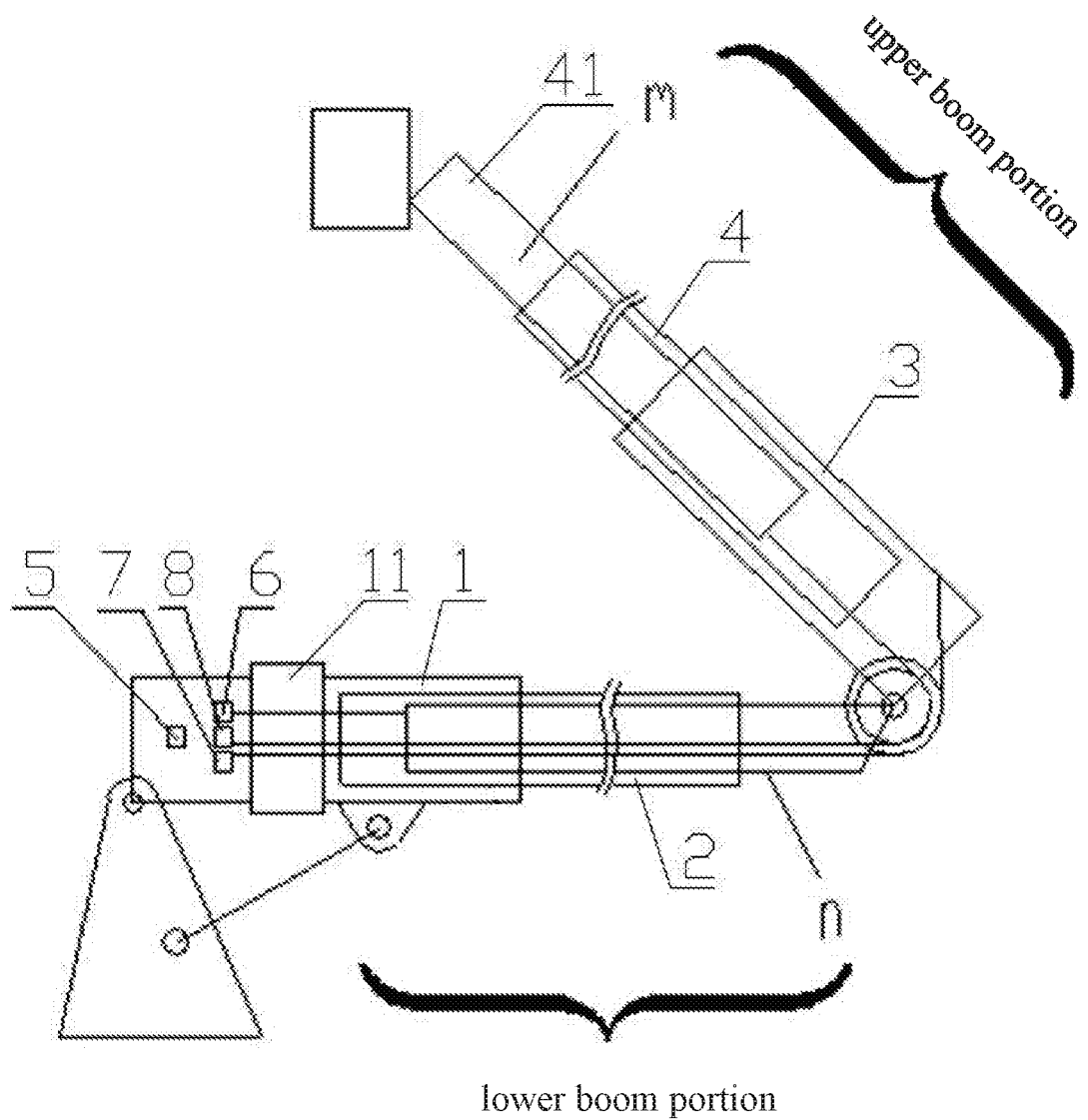
FIG. 1 is a structural schematic diagram showing the work platform radius limiting device according to the present disclosure mounted on the boom assembly.

As shown in FIG. 1, the boom assembly includes the lower boom portion and the upper boom portion. The lower boom portion includes the basic section arm 1 and the basic telescopic arm 2. The upper boom portion includes the two-section arm 3 and the two-section telescopic arm 4. One end of the basic section arm 1 is hingedly connected to the turntable. The basic section arm 1 is provided with the auxiliary insulation section 11. At least one basic telescopic arm 2 is telescopically provided inside the basic section arm 1. One end of the two-section arm 3 is hingedly connected to the end portion of the end section of the basic telescopic arm 2. At least one two-section telescopic arm 4 is telescopically provided inside the two-section arm 3. The end section of the two-section telescopic arm 4 is the main insulation end 41. The main insulation end 41 is connected to the insulated work platform through an automatic leveling device.

The work platform radius limiting device includes the lower boom inclination angle detecting sensor 5, the lower boom length detecting sensor 6, the upper boom derricking detecting sensor 7, the upper boom length detecting sensor 8, and the electrical control mechanism.

The lower boom inclination angle detecting sensor 5 is provided on the root portion metal section, located behind the auxiliary insulation section 11 near the hinge position of the turntable, of the basic section arm 1.

The lower boom length detecting sensor 6, the upper boom derricking detecting sensor 7 and the upper boom length detecting sensor 8 each include an insulated distance measuring rope and an insulated distance measuring rope retraction-and-extension measuring mechanism. The length and diameter of the insulated distance measuring rope are kept constant before and after being applied with a tension force. One end of each insulated distance measuring rope is fixed and the remaining part of the insulated distance measuring rope is wound on the corresponding insulation distance measuring rope retraction-and-extension measuring mechanism. All of the insulated distance measuring rope retraction-and-extension measuring mechanisms are provided on the root portion metal section, located behind the auxiliary insulation section 11 near the hinge position of the turntable, of the basic section arm 1. The insulated distance measuring rope retraction-and-extension measuring mechanism is provided with an automatic rewinding structure. The upper boom derricking detecting sensor 7 and the upper boom length detecting sensor 8 each further include an insulated rope guiding sheave. Two insulated distance measuring rope guiding sheaves are set and mounted at the hinge position of the end portion of the end section of the basic telescopic arm 2. The other end of the insulated distance measuring rope of the lower boom length detecting sensor 6 is connected to the tail portion of the end section of the basic telescopic arm 2. During the extension of the basic telescopic arm 2, the insulated distance measuring rope of the lower boom length detecting sensor 6 is pulled. The other end of the insulated distance measuring rope of the upper boom derricking detecting sensor 7 is connected to the tail portion of the two-section arm 3 via the guiding of the corresponding insulated rope guiding sheave. During the stretching of the two-section arm 3, the insulated distance measuring rope of the upper boom derricking detecting sensor 7 is pulled. The other end of the insulated distance measuring rope of the upper boom length detecting sensor 8 is connected to the tail portion of the main insulation end 41 via the guiding of the corresponding insulated rope guiding sheave. During the extension of the two-section telescopic arm 4, the insulated measuring distance rope of the upper boom length detecting sensor 8 is pulled.

The electrical control mechanism includes the central processing unit, the data collection and feedback loop, the insulated work platform radius calculation and output loop, the data comparison loop, the radius limiting control loop and the controller. The central processing unit is electrically connected to the lower boom inclination angle detecting sensor 5 and the controller, respectively. The central processing unit is electrically connected to the insulated distance measuring rope retraction-and-extension measuring mechanisms of the lower boom length detecting sensor 6, the upper boom derricking detecting sensor 7, and the upper boom length detecting sensor 8, respectively. The controller is electrically connected to the vehicle-mounted hydraulic system.

In order to protect the lower boom inclination angle detecting sensor 5, the lower boom length detecting sensor 6, the upper boom derricking detecting sensor 7, and the upper boom length detecting sensor 8 from the accidental damages which may cause detection failure, and to achieve a tidy appearance, as a further improvement of the present disclosure, the lower boom inclination angle detecting sensor 5, the lower boom length detecting sensor 6, the upper boom derricking detecting sensor 7, and the upper boom length detecting sensor 8 are set and mounted inside the basic section arm 1. The other ends of the insulated distance measuring ropes of the upper boom derricking detecting sensor 7 and the upper boom length detecting sensor 8 are both provided inside the upper boom portion.

In order to collect the length information in a relatively simpler manner and ensure the accuracy of the collected length information, as a further improvement of the present disclosure, the insulated distance measuring rope of the lower boom length detecting sensor 6, the insulated distance measuring rope, located inside the lower boom portion, of the upper boom derricking detecting sensor 7, and the insulated distance measuring rope, located inside the lower boom portion, of the upper boom length detecting sensor 8 are all arranged in parallel to the central axis of the lower boom portion. The insulated distance measuring rope, located inside the upper boom portion, of the upper boom length detecting sensor 8 is arranged in parallel to the central axis of the upper boom portion.

In order to facilitate the installation and collect the length information in a relatively simpler manner, as a further improvement of the present disclosure, the insulated rope guiding sheave of the upper boom derricking detecting sensor 7 and the insulated rope guiding sheave of the upper boom length detecting sensor 8 are concentrically mounted.

In order to facilitate the installation and collect the length information in a further relatively simpler manner, as a further improvement of the present disclosure, the insulated rope guiding sheave of the upper boom derricking detecting sensor 7 and the insulated rope guiding sheave of the upper boom length detecting sensor 8 are coaxially mounted and identical dimensionally.

In order to reduce the contact area between the insulated distance measuring rope and the insulated rope guiding sheave of the upper boom derricking detecting sensor 7, thereby reducing the wear of the insulated distance measuring rope caused by the insulated rope guiding sheave, as a further improvement of the present disclosure, the other end of the insulated distance measuring rope of the upper boom derricking detecting sensor 7 is connected to the inner side surface, which is relatively far from the hinge position, of the tail portion of the two-section arm 3.

Figure 8:
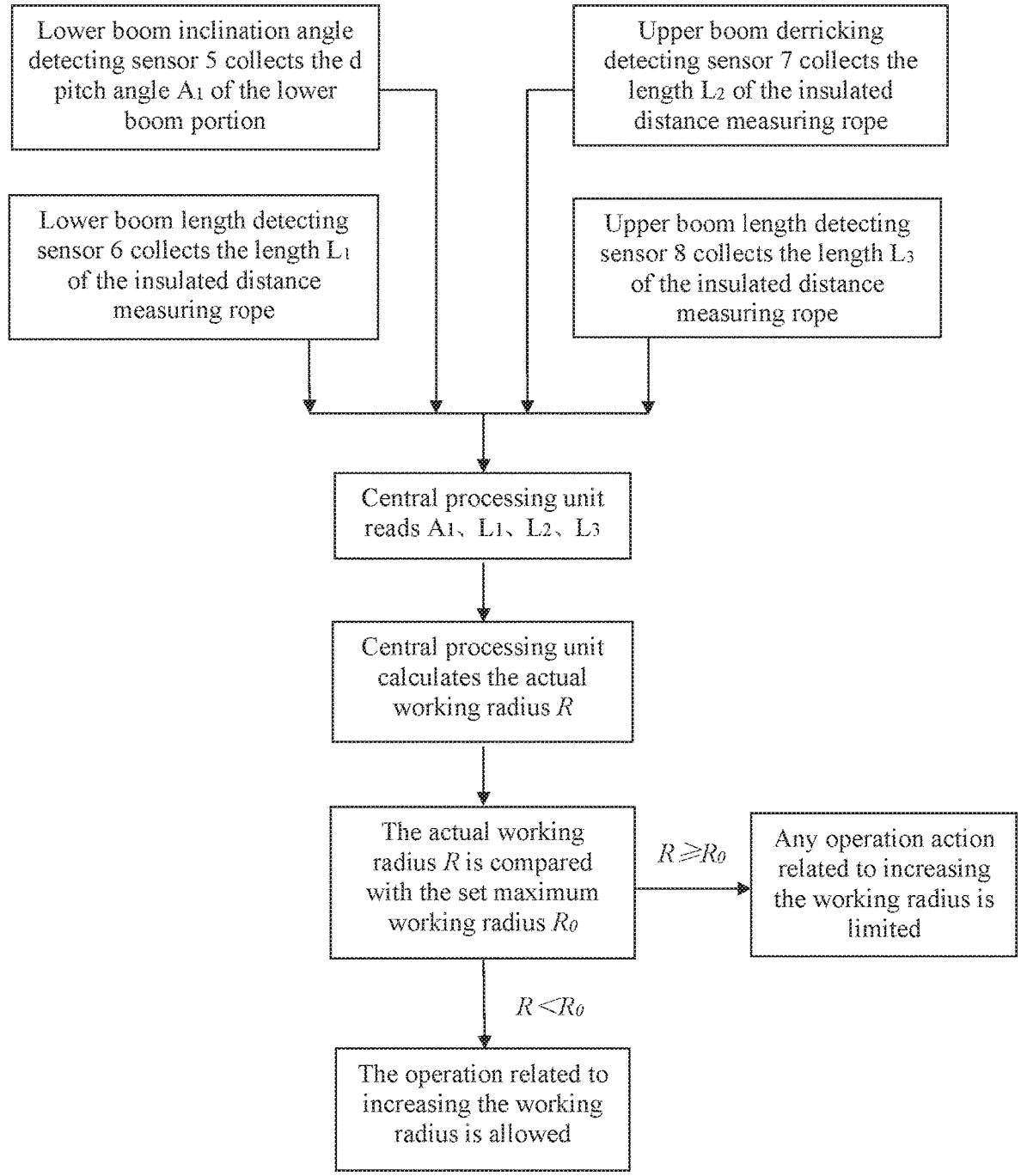
FIG. 8 is a control flow chart of the automatic radius limiting method for the insulated work platform of the vehicle mounted with insulated aerial work platform according to the present disclosure.

In the control process of the radius change of the vehicle mounted with insulated aerial work platform, the work platform radius limiting device keeps running all the while. As shown in FIG. 8, first, the data collection and feedback loop is started up. The central processing unit of the electrical control mechanism collects the pitch angle of the lower boom portion by the lower boom inclination angle detecting sensor 5 in real time, and the insulated distance measuring rope retraction-and-extension measuring mechanisms of the lower boom length detecting sensor 6, the upper boom derricking detecting sensor 7, and the upper boom length detecting sensor 8 detect the extension lengths of the insulation distance measuring ropes of the lower boom length detecting sensor 6, the upper boom derricking detecting sensor 7, and the upper boom length detecting sensor 8, in real time. Then, the insulated work platform radius calculation and output loop is started up. The central processing unit of the electrical control mechanism calculates an actual working radius of the insulated work platform according to the data feedback and the set program. Subsequently, the data comparison loop and the radius limiting control loop are started up. The central processing unit of the electrical control mechanism compares the actual working radius of the insulated work platform with a predetermined maximum working radius of the insulated work platform and then outputs the comparison result. When the actual working radius is less than the predetermined maximum working radius, the central processing unit of the electrical control mechanism outputs the signal to the controller to allow the operator to perform the operational action related to increasing the working radius. When the actual working radius is greater than or equal to the predetermined maximum working radius, the central processing unit of the electrical control mechanism outputs the signal to the controller to limit the operator from performing any operational action related to increasing the working radius.

When the basic telescopic arm 2 and the two-section telescopic arm 4 are in an initial state of full retraction, the initial length of the lower boom portion is set to $L_{0lower}$, the initial length of the upper boom portion is set to $L_{0upper}$, and the initial angle between the lower boom portion and a level surface is set to $A_1$. At this time, a reading of the angle from the lower boom inclination angle detecting sensor 5 is $A_1$.

Figure 2:
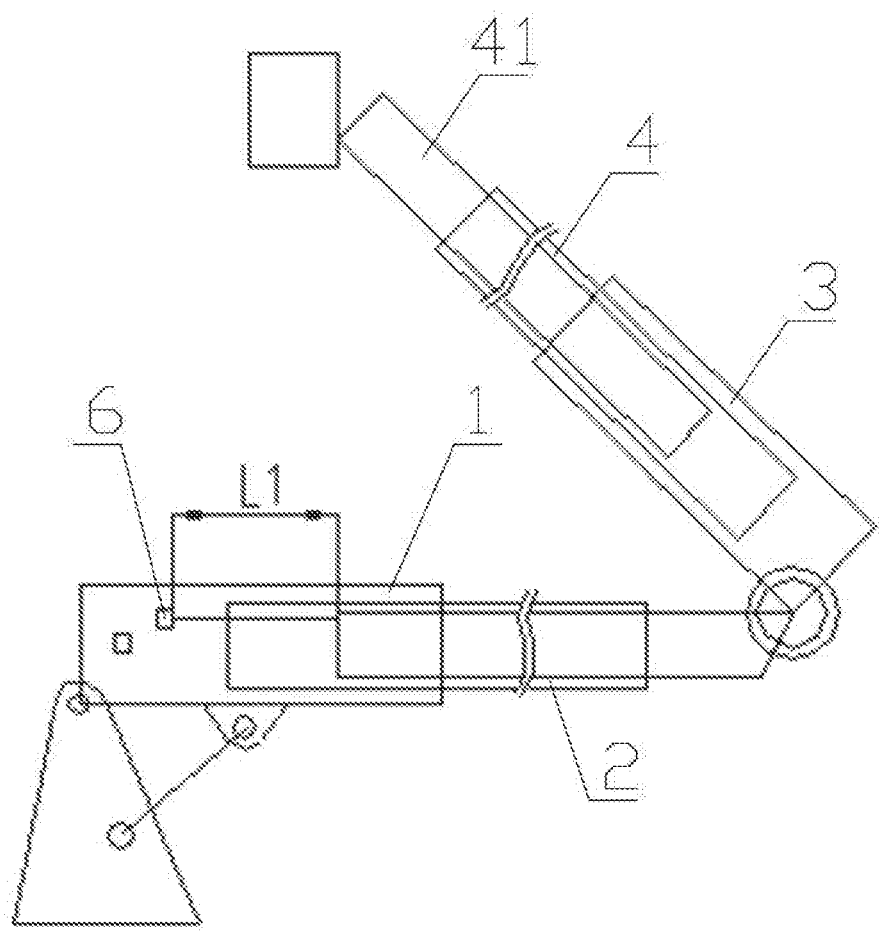
FIG. 2 is a schematic diagram showing the installation and the length measurement of the lower boom length detecting sensor according to the present disclosure.

The initial angle between the upper boom portion and the lower boom portion is set to $A_2$. As shown in FIG. 2, the initial extension length of the insulated distance measuring rope of the lower boom length detecting sensor 6 is set to $L_1$. The initial extension length of the insulated measuring distance rope of the upper boom derricking detecting sensor 7 is set to $L_2$. The initial extension length of the insulation distance measuring rope of the upper boom length detecting sensor 8 is set to $L_3$.

When the lower boom portion is lifted, the angle between the lower boom portion and the level surface is set to $A_1'$.

When the upper boom portion is lifted relative to the lower boom portion, the angle between the upper boom portion and the lower boom portion is set to $A_2'$, the length of the insulated distance measuring rope of the upper boom derricking detecting sensor 7 is set to $L_2'$, and the length of the insulated distance measuring rope of the upper boom length detecting sensor 8 is set to $L_3'$.

Figure 5:
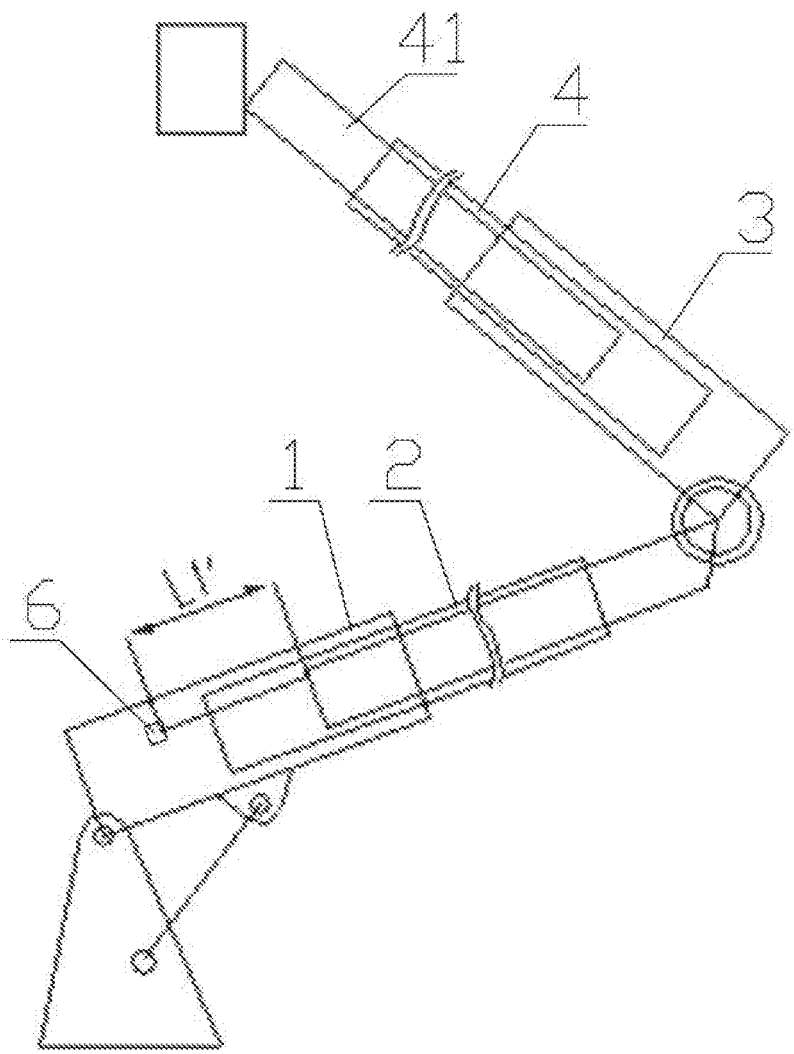
FIG. 5 is a schematic diagram showing the length measurement of the lower boom length detecting sensor with the variation of the radius of the insulated work platform according to the present disclosure.

As shown in FIG. 5, after the $n^{th}$ section arm of the basic telescopic arm 2 of the lower boom portion is extended by a distance, the length of the insulated distance measuring rope of the lower boom length detecting sensor 6 is set to $L_1'$.

When the total length of the lower boom portion and the angle between the upper boom portion and the lower boom portion are maintained in the initial state, and the $m^{th}$ section arm of the two-section telescopic arm 4 of the upper boom portion is extended by a distance, the length of the insulated distance measuring rope of the upper boom length detecting sensor 8 is set to $L_3''$.

Figure 3:
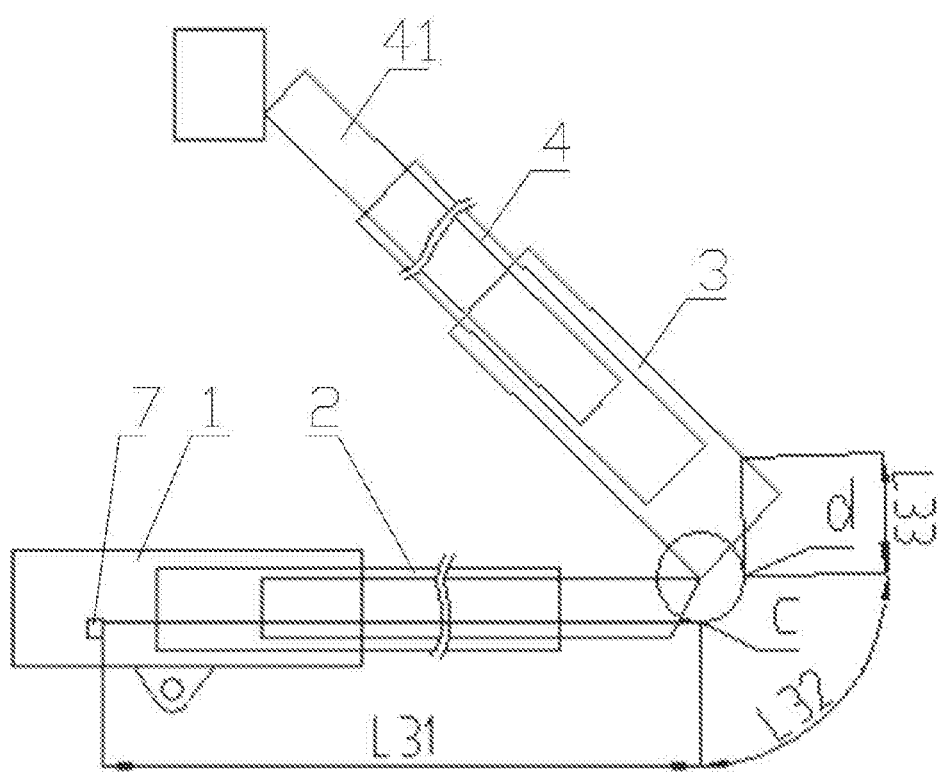
FIG. 3 is a schematic diagram showing the installation and the length measurement of the upper boom derricking detecting sensor according to the present disclosure.

As shown in FIG. 3, the distance between an outlet position of the insulation distance measuring rope of the insulated distance measuring rope retraction-and-extension measuring mechanism of the upper boom derricking detecting sensor 7 and the tangent point c of the insulated distance measuring rope and the insulated rope guiding sheave of the upper boom derricking detecting sensor 7 is set to $L_{31}$. The distance between the end portion of the insulated distance measuring rope, connected to the tail portion of two-section arm 3, of the upper boom derricking detecting sensor 7 and the tangent point d of the insulated distance measuring rope and the insulated rope guiding sheave of the upper boom derricking detecting sensor 7 is set to $L_{33}$. When the upper boom portion and the lower boom portion are both in the initial state, the length $L_{32}$ of the insulated distance measuring rope of the upper boom derricking detecting sensor 7 wound on the insulated rope guiding sheave of the upper boom derricking detecting sensor 7 is $$L_{32}=L_3-L_{31}-L_{33}.$$

Figure 4:
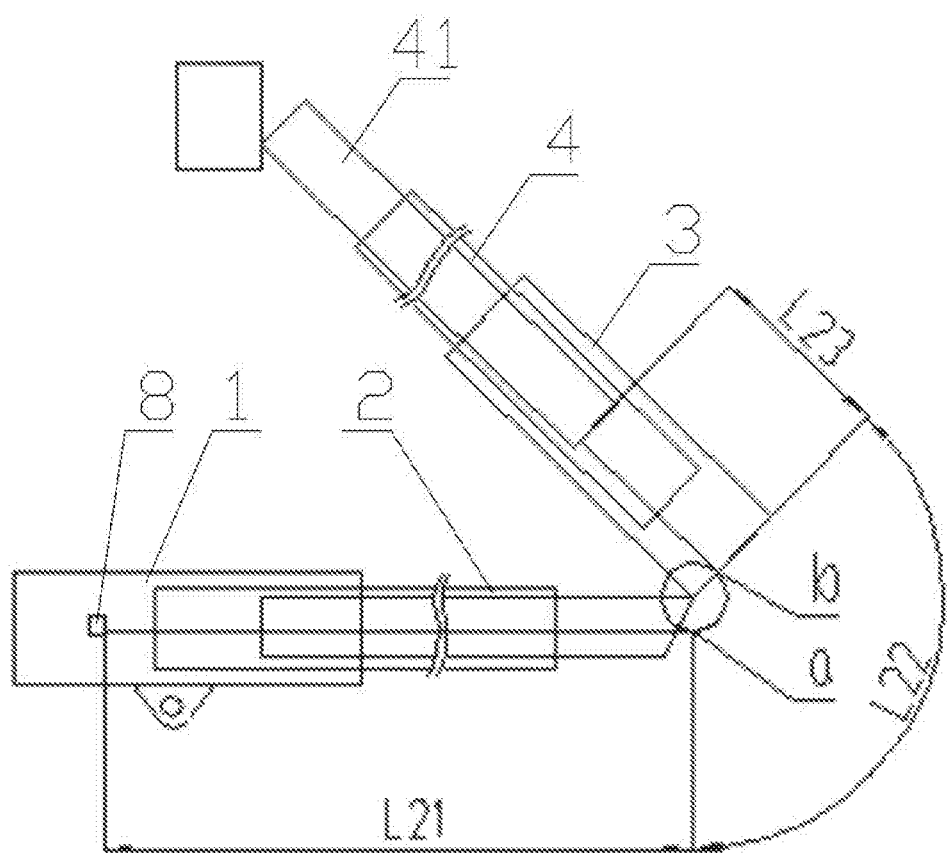
FIG. 4 is a schematic diagram showing the installation and the length measurement of the upper boom length detecting sensor according to the present disclosure.

As shown in FIG. 4, the distance between an outlet position of the insulated distance measuring rope of the insulated distance measuring rope retraction-and-extension measuring mechanism of the upper boom length detecting sensor 8 and the tangent point a of the insulated distance measuring rope and the insulated rope guiding sheave of the upper boom length detecting sensor 8 is set to $L_{21}$. The distance between an end portion of the insulated distance measuring rope, connected to the tail portion of the main insulation end 41, of the upper boom length detecting sensor 8 and the tangent point b of the insulated distance measuring rope and the insulated rope guiding sheave of the upper boom length detecting sensor 8 is set to $L_{23}$. When the upper boom portion and the lower boom portion are both in the initial state, the length $L_{22}$ of the insulated distance measuring rope of the upper boom length detecting sensor 8 wound on the insulated rope guiding sheave of the upper boom length detecting sensor 8 is $$L_{22}=L_2-L_{21}-L_{23}.$$

The pitch diameter of a rope groove on the insulated rope guiding sheave of the upper boom derricking detecting sensor 7 is set to $R_1$, and the pitch diameter of a rope groove on the insulated rope guiding sheave of the upper boom length detecting sensor 8 is set to $R_2$.

Figure 6:
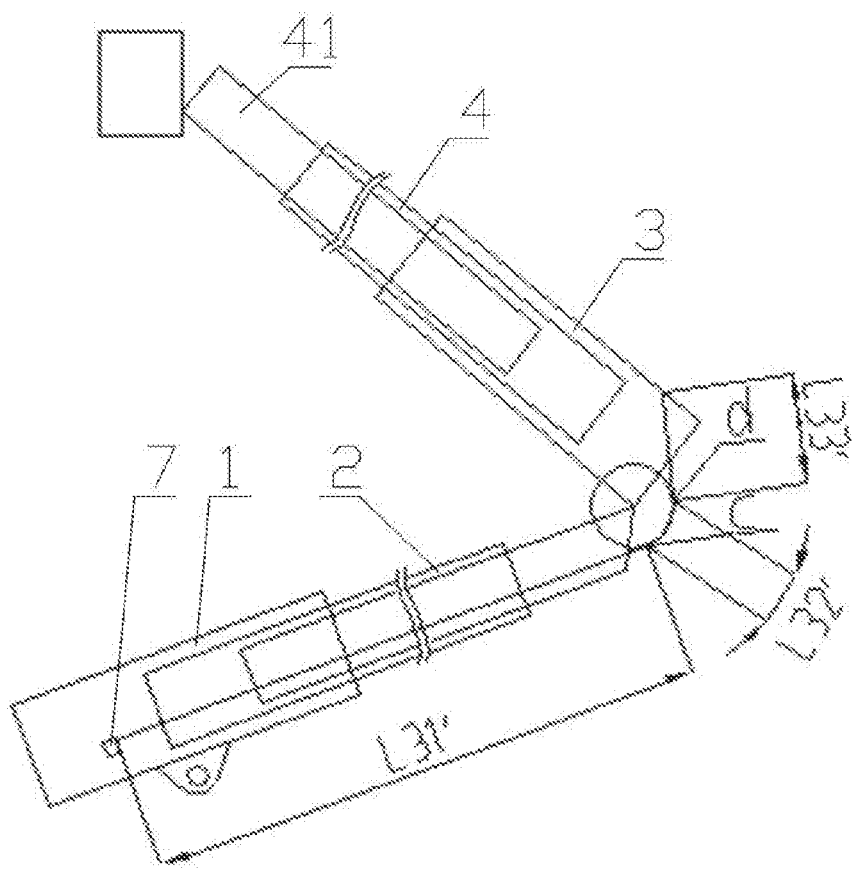
FIG. 6 is a schematic diagram showing the length measurement of the upper boom derricking detecting sensor with the variation of the radius of the insulated work platform according to the present disclosure.

As shown in FIG. 6, when the upper boom portion and the lower boom portion move from the initial state to a given position, the angle between the lower boom portion and the level surface is $A_1'$, and the length $L_{32}'$ of the insulated distance measuring rope of the upper boom derricking detecting sensor 7 wound on the insulated rope guiding sheave of the upper boom derricking detecting sensor 7 is $$L'_{32} = L_{32} - \frac{R_2}{R_1} \cdot (L'_{22} - L_{22}).$$

Figure 7:
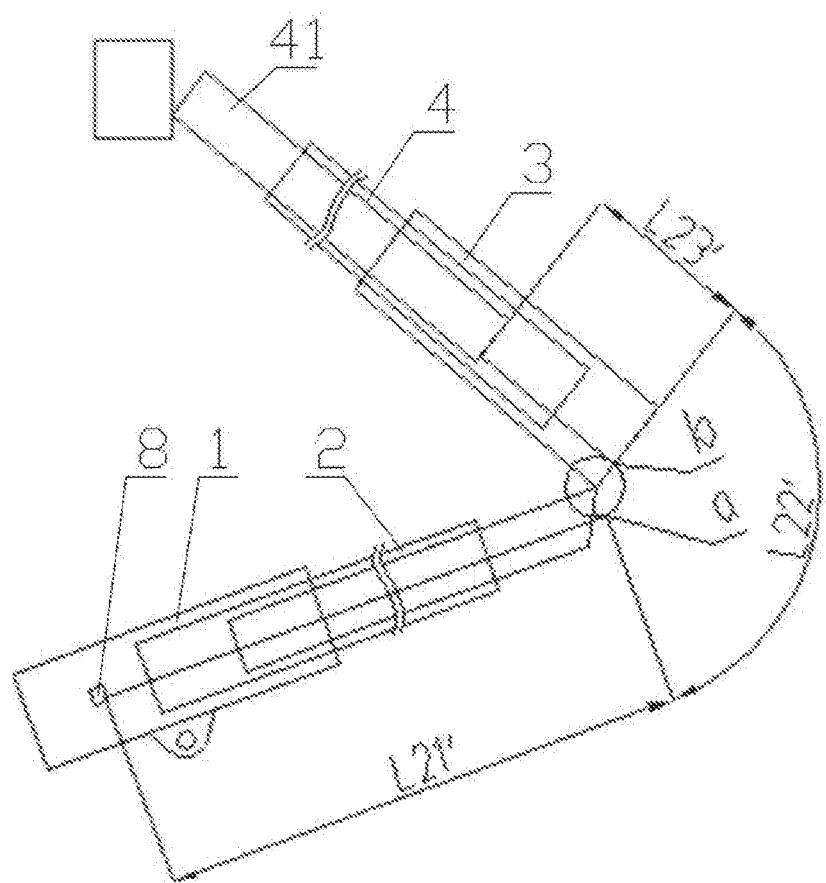
FIG. 7 is a schematic diagram showing the length measurement of the upper boom length detecting sensor with the variation of the radius of the insulated work platform according to the present disclosure.

As shown in FIG. 7, at this time, the length $L_{22}'$ of the insulated distance measuring rope, wound on the insulated rope guiding sheave of the upper boom length detecting sensor 8, of the upper boom length detecting sensor 8 is $$L_{22}'=L_2'-[L_{21}+(L_1'-L_1)]-L_{23}.$$

The variation of the angle between the upper boom portion and the lower boom portion is $$A'_2 - A_2 = \frac{(L'_{22} - L_{22}) \times 180}{\pi \cdot R_2}.$$

The length of the lower boom portion is $$L_{lower}=L_{0lower}+(L_1'-L_1).$$

The length of the upper boom portion is $$L_{upper}=L_{0upper}+[L_3'-L_3-(L_1'-L_1)-L_{32}'].$$

Then, the actual working radius R of the insulated aerial work platform is calculated as below,
when $0°\leq A_1'\leq 90°$, and $A_1'<A_2'$, $$R=|L_{lower}\cdot\cos A_1'-L_{upper}\cdot\cos(A_1'-A_2')|;$$

when $0°\leq A_1'90°$, and $A_1'>A_2'$, $$R=|L_{lower}\cdot\cos A_1'-L_{upper}\cdot\cos(A_2'-A_1')|;$$

when $90°<A_1'<180°$, and $A_1'<A_2'$, $$R=L_{lower}\cdot\cos A_1'+L_{upper}\cdot\cos(180°-A_1'-A_2');$$

when $90°<A_1'180°$, and $A_1'>A_2'$ $$R=L_{lower}\cdot\cos A_1'+L_{upper}\cdot\cos(A_1'-A_2').$$

The maximum working radius of the insulated work platform of the vehicle mounted with the insulated aerial work platform is set to $R_0$. When the actual working radius R calculated and fed back by the central processing unit according to the insulated work platform radius calculation and output loop is less than the predetermined maximum working radius $R_0$, the central processing unit outputs the signal to the controller to allow the operator to perform the operational action related to increasing the working radius. When the actual working radius R calculated and fed back by the central processing unit according to the insulated work platform radius calculation and output loop is greater than or equal to the predetermined maximum working radius $R_0$, the central processing unit outputs the signal to the controller to limit the operator from performing any operational action related to increasing the working radius.

What is claimed is:

1. A vehicle mounted with an insulated aerial work platform, comprising a vehicle body assembly, a turntable, a boom assembly, an insulated aerial work platform and a work platform radius limiting device, wherein the turntable is mounted on the vehicle body assembly by a stewing bearing and a stewing drive; the boom assembly comprises a lower boom portion and an upper boom portion; the lower boom portion comprises a basic section arm and a basic telescopic arm, and the upper boom portion comprises a two-section arm and a two-section telescopic arm; one end of the basic section arm is hingedly connected to the turntable; the basic section arm is provided with an auxiliary insulation section; the basic telescopic arm is telescopically provided inside the basic section arm; one end of the two-section arm is hingedly connected to an end portion of an end section of the basic telescopic arm; the two-section telescopic arm is telescopically provided inside the two-section arm; an end section of the two-section telescopic arm is a main insulation end; the main insulation end is connected to the insulated aerial work platform through an automatic leveling device; wherein, the work platform radius limiting device comprises a lower boom inclination angle detecting sensor, a lower boom length detecting sensor, an upper boom derricking detecting sensor, an upper boom length detecting sensor and an electrical control mechanism;

the lower boom inclination angle detecting sensor is provided on a root portion metal section of the basic section arm and the root portion metal section is located behind the auxiliary insulation section near the hinge position of the turntable, and the root portion metal section is located behind the auxiliary insulation section near a hinge position of the turntable;

the lower boom length detecting sensor, the upper boom derricking detecting sensor and the upper boom length detecting sensor each comprise an insulated distance measuring rope and an insulated distance measuring rope retraction-and-extension measuring mechanism; a first end of the insulated distance measuring rope is fixed and a remaining part of the insulated distance measuring rope is correspondingly wound on the insulated distance measuring rope retraction-and-extension measuring mechanism; all of the insulated distance measuring rope retraction-and-extension measuring mechanisms are provided on the root portion metal section of the basic section arm; the insulated distance measuring rope retraction-and-extension measuring mechanism is provided with an automatic rewinding structure; the upper boom derricking detecting sensor and the upper boom length detecting sensor each further comprise an insulated rope guiding sheave; the two insulated distance measuring rope guiding sheaves are set and mounted at a hinge position of the end portion of the end section of the basic telescopic arm; a second end of the insulated distance measuring rope of the lower boom length detecting sensor is connected to the end portion of the end section of the basic telescopic arm; a second end of the insulated distance measuring rope of the upper boom derricking detecting sensor is connected to a tail portion of the two-section arm via a guiding of the corresponding insulated rope guiding sheave; a second end of the insulated distance measuring rope of the upper boom length detecting sensor is connected to a tail portion of the main insulation end via the guiding of the corresponding insulated rope guiding sheave; and the electrical control mechanism comprises a central processing unit, a data collection and a feedback loop, an insulated work platform radius calculation and output loop, a data comparison loop, a radius limiting control loop and a controller; the central processing unit is electrically connected to the lower boom inclination angle detecting sensor and the controller respectively; the central processing unit is electrically connected to the insulated distance measuring rope retraction-and-extension measuring mechanisms of the lower boom length detecting sensor, the upper boom derricking detecting sensor and the upper boom length detecting sensor; and the controller is electrically connected to a vehicle-mounted hydraulic system.

2. The vehicle mounted with the insulated aerial work platform according to claim 1, wherein the lower boom inclination angle detecting sensor, the lower boom length detecting sensor, the upper boom derricking detecting sensor and the upper boom length detecting sensor are set and mounted inside the basic section arm; and the second ends of the insulated distance measuring ropes of the upper boom derricking detecting sensor and the upper boom length detecting sensor are both mounted inside the upper boom portion.

3. The vehicle mounted with the insulated aerial work platform according to claim 2, wherein the insulated distance measuring rope of the lower boom length detecting sensor, the insulated distance measuring rope, located inside the lower boom portion, of the upper boom derricking detecting sensor, and the insulated distance measuring rope, located inside the lower boom portion, of the upper boom length detecting sensor are all arranged in parallel to a central axis of the lower boom portion; and the insulated distance measuring rope, located in the upper boom portion, of the upper boom length detecting sensor is arranged in parallel to a central axis of the upper boom portion.

4. The vehicle mounted with the insulated aerial work platform according to claim 3, wherein the insulated rope guiding sheave of the upper boom derricking detecting sensor and the insulated rope guiding sheave of the upper boom length detecting sensor are concentrically mounted.

5. The vehicle mounted with the insulated aerial work platform according to claim 3, wherein the second end of the insulated distance measuring rope of the upper boom derricking detecting sensor is connected to an inner side surface of the tail portion of the two-section arm, and the inner side surface is located away from the hinge position.

6. The vehicle mounted with the insulated aerial work platform according to claim 2, wherein the insulated rope guiding sheave of the upper boom derricking detecting sensor and the insulated rope guiding sheave of the upper boom length detecting sensor are concentrically mounted.

7. The vehicle mounted with the insulated aerial work platform according to claim 2, wherein the second end of the insulated distance measuring rope of the upper boom derricking detecting sensor is connected to an inner side surface of the tail portion of the two-section arm, and the inner side surface is located away from the hinge position.

8. The vehicle mounted with the insulated aerial work platform according to claim 1, wherein the insulated rope guiding sheave of the upper boom derricking detecting sensor and the insulated rope guiding sheave of the upper boom length detecting sensor are concentrically mounted.

9. The vehicle mounted with the insulated aerial work platform according to claim 8, wherein the insulated rope guiding sheave of the upper boom derricking detecting sensor and the insulated rope guiding sheave of the upper boom length detecting sensor are coaxially mounted, and are identical dimensionally.

10. The vehicle mounted with the insulated aerial work platform according to claim 1, wherein the second end of the insulated distance measuring rope of the upper boom derricking detecting sensor is connected to an inner side surface of the tail portion of the two-section arm, and the inner side surface is located away from the hinge position.

11. An automatic radius limiting method for an insulated aerial work platform of a vehicle mounted with the insulated aerial work platform, comprising the following steps:

a. data collection: starting up a data collection and feedback loop, collecting, by a central processing unit of an electrical control mechanism, a pitch angle of a lower boom portion via a lower boom inclination angle detecting sensor in real time, and detecting, by insulated distance measuring rope retraction-and-extension measuring mechanisms of a lower boom length detecting sensor, an upper boom derricking detecting sensor, and an upper boom length detecting sensor, extension lengths of insulation distance measuring ropes of the lower boom length detecting sensor, the upper boom derricking detecting sensor, and the upper boom length detecting sensor, in real time;

b. data calculation: starting up an insulated work platform radius calculation and output loop, and calculating, by the central processing unit of the electrical control mechanism, an actual working radius of the insulated aerial work platform according to data feedback and a predetermined program;

c. data comparison and output: starting up a data comparison loop and a radius limiting control loop, comparing, by the central processing unit of the electrical control mechanism, the actual working radius of the insulated aerial work platform with a predetermined maximum working radius of the insulated aerial work platform, and outputting a comparison result; and d. radius limiting control: when the actual working radius is less than the predetermined maximum working radius, outputting, by the central processing unit of the electrical control mechanism, a signal to a controller to allow an operator to perform an operational action related to increasing a working radius, and when the actual working radius is greater than or equal to the predetermined maximum working radius, outputting, by the central processing unit of the electrical control mechanism, a signal second to the controller to limit the operator from performing any operational action related to increasing the working radius.

12. The automatic radius limiting method for the insulated aerial work platform of the vehicle mounted with the insulated aerial work platform according to claim 11, wherein in the step b, the actual working radius of the insulated aerial work platform is determined by the following steps:

when a basic telescopic arm and a two-section telescopic arm are in an initial state of full retraction, setting an initial length of the lower boom portion to $L_{0lower}$, setting an initial length of the upper boom portion to $L_{0upper}$, and setting an initial angle between the lower boom portion and a level surface to $A_1$; wherein, at this time, a reading of an angle from the lower boom inclination angle detecting sensor is $A_1$;

setting an initial angle between the upper boom portion and the lower boom portion to $A_2$, setting an initial extension length of the insulated distance measuring rope of the lower boom length detecting sensor to $L_1$, setting an initial extension length of the insulated measuring distance rope of the upper boom derricking detecting sensor to $L_2$, and setting an initial extension length of the insulation distance measuring rope of the upper boom length detecting sensor to $L_3$;

when the lower boom portion is lifted, setting an angle between the lower boom portion and the level surface to $A_1'$;

when the upper boom portion is lifted relative to the lower boom portion, setting an angle between the upper boom portion and the lower boom portion to $A_2'$, setting a length of the insulated distance measuring rope of the upper boom derricking detecting sensor to $L_2'$, and setting a length of the insulation distance measuring rope of the upper boom length detecting sensor to $L_3'$;

after an $n^{th}$ section arm of the basic telescopic arm of the lower boom portion is extended by a distance, setting the length of the insulated distance measuring rope of the lower boom length detecting sensor to $L_1'$;

when a total length of the lower boom portion and the angle between the upper boom portion and the lower boom portion are maintained in the initial state, and an $m^{th}$ section arm of the two-section telescopic arm of the upper boom portion is extended by a distance, setting a length of the insulated distance measuring rope of the upper boom length detecting sensor to $L_3''$;

setting a distance between an outlet position of the insulated distance measuring rope of the insulated distance measuring rope retraction-and-extension measuring mechanism of the upper boom derricking detecting sensor and a tangent point c of the insulated distance measuring rope and the insulated rope guiding sheave of the upper boom derricking detecting sensor to $L_{31}$, and setting a distance between an end portion of the insulated distance measuring rope, connected to a tail portion of two-section arm, of the upper boom derricking detecting sensor and a tangent point d of the insulated distance measuring rope and the insulated rope guiding sheave of the upper boom derricking detecting sensor to $L_{33}$; wherein, when the upper boom portion and the lower boom portion are both in the initial state, a length $L_{32}$ of the insulated distance measuring rope of the upper boom derricking detecting sensor wound on the insulated rope guiding sheave of the upper boom derricking detecting sensor is $L_{32}=L_3-L_{31}-L_{33}$;

setting a distance between an outlet position of the insulation distance measuring rope of the insulated distance measuring rope retraction-and-extension measuring mechanism of the upper boom length detecting sensor and a tangent point a of the insulated distance measuring rope and the insulated rope guiding sheave of the upper boom length detecting sensor to $L_{21}$, and setting a distance between an end portion of the insulated distance measuring rope, connected to a tail portion of the main insulation end, of the upper boom length detecting sensor and a tangent point b of the insulated distance measuring rope and the insulated rope guiding sheave of the upper boom length detecting sensor to $L_{23}$; wherein, when the upper boom portion and the lower boom portion are in the initial state, a length $L_{22}$ of the insulated distance measuring rope of the upper boom length detecting sensor wound on the insulated rope guiding sheave of the upper boom length detecting sensor is $L_{22}=L_2-L_{21}-L_{23}$;

setting a pitch diameter of a rope groove on the insulated rope guiding sheave of the upper boom derricking detecting sensor to $R_1$, and setting a pitch diameter of a rope groove on the insulated rope guiding sheave of the upper boom length detecting sensor to $R_2$;

wherein, when the upper boom portion and the lower boom portion move from the initial state to a given position, the angle between the lower boom portion and the level surface is $A_1'$, and the length $L_{32}'$ of the insulated distance measuring rope of the upper boom derricking detecting sensor wound on the insulated rope guiding sheave of the upper boom derricking detecting sensor is $$L'_{32} = L_{32} - \frac{R_2}{R_1} \cdot (L'_{22} - L_{22});$$

at this time, the length $L_{22}'$ of the insulated distance measuring rope of the upper boom length detecting sensor wound on the insulated rope guiding sheave of the upper boom length detecting sensor is $L_{22}'=L_2'-[L_{21}+(L_1'-L_1)]-L_{23}$;

a variation of the angle between the upper boom portion and the lower boom portion is $$A_2' - A_2 = \frac{(L_{22}' - L_{22}) \times 180}{\pi \cdot R_2};$$

at this time, a length of the lower boom portion is $L_{lower}=L_{0lower}+(L_1'-L_1)$;

at this time, a length of the upper boom portion is $L_{upper}=L_{0upper}+[L_3'-L_3-(L_1'-L_1)-L_{32}']$;

then, the actual working radius R of the insulated aerial work platform is calculated as below,
when $0° \leq A_1' \leq 90°$, and $A_1' < A_2'$, $R=|L_{lower} \cdot \cos A_1' - L_{upper} \cdot \cos(A_1'-A_2')|$;

when $0° \leq A_1' 90°$, and $A_1' > A_2'$, $R=|L_{lower} \cdot \cos A_1' - L_{upper} \cdot \cos(A_2'-A_1')|$;

when $90° < A_1' < 180°$, and $A_1' < A_2'$, $R=L_{lower} \cdot \cos A_1' + L_{upper} \cdot \cos(180°-A_1'-A_2')$;

when $90° < A_1' 180°$, and $A_1' > A_2'$ $R=L_{lower} \cdot \cos A_1' + L_{upper} \cdot \cos(A_1'-A_2')$.

\* \* \* \* \*